(12) United States Patent
Yamada et al.

(10) Patent No.: US 7,557,703 B2
(45) Date of Patent: Jul. 7, 2009

(54) POSITION MANAGEMENT SYSTEM AND POSITION MANAGEMENT PROGRAM

(75) Inventors: Kentaro Yamada, Saitama (JP); Yuji Hasegawa, Saitama (JP); Takahiro Nakamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 345 days.

(21) Appl. No.: 11/482,785

(22) Filed: Jul. 10, 2006

(65) Prior Publication Data

US 2007/0013510 A1 Jan. 18, 2007

(30) Foreign Application Priority Data

Jul. 11, 2005 (JP) ............................... 2005-202292

(51) Int. Cl.
*G08B 5/22* (2006.01)
(52) U.S. Cl. .............................. 340/539.1; 340/825.49; 340/539.13; 180/167; 700/258; 700/245
(58) Field of Classification Search ... 340/572.1–572.9, 340/10.1–10.6, 539.1; 367/118–130
See application file for complete search history.

(56) References Cited

U.S. PATENT DOCUMENTS

| 5,577,733 | A | * | 11/1996 | Downing | ..................... | 273/348 |
| 5,798,703 | A | * | 8/1998 | Sakai et al. | .................. | 340/666 |
| 5,940,346 | A | * | 8/1999 | Sadowsky et al. | ........... | 367/128 |
| 6,005,482 | A | * | 12/1999 | Moran et al. | ............. | 340/568.8 |
| 6,348,856 | B1 | * | 2/2002 | Jones et al. | ................. | 340/10.1 |
| 6,377,888 | B1 | * | 4/2002 | Olch | .......................... | 701/207 |
| 6,674,687 | B2 | * | 1/2004 | Zeitzew | ........................ | 367/6 |
| 6,977,587 | B2 | * | 12/2005 | Pradhan et al. | ........ | 340/539.26 |
| 7,151,979 | B2 | * | 12/2006 | Andersen et al. | ............ | 700/214 |
| 7,239,241 | B2 | * | 7/2007 | Claudatos et al. | ........ | 340/572.1 |
| 2002/0161651 | A1 | * | 10/2002 | Godsey et al. | ................ | 705/22 |
| 2005/0129254 | A1 | * | 6/2005 | Connor et al. | ................ | 381/77 |
| 2005/0197752 | A1 | * | 9/2005 | Yang et al. | .................... | 701/23 |
| 2005/0216124 | A1 | * | 9/2005 | Suzuki | ....................... | 700/253 |

FOREIGN PATENT DOCUMENTS

| JP | 2001-62760 A | 3/2001 |
| JP | 2001-183455 A | 7/2001 |
| JP | 2002-326173 A | 11/2002 |
| JP | 2004-299025 A | 10/2004 |

\* cited by examiner

*Primary Examiner*—Daniel Wu
*Assistant Examiner*—Brian Wilson
(74) *Attorney, Agent, or Firm*—Birch, Stewart, Kolasch & Birch, LLP

(57) ABSTRACT

A position management system including two or more types of detection tags provided to objects whose positions are to be detected, detectors provided corresponding to the detection tags, and a position data processor, in which the detection tags complement detection abilities with each other, in which when a detector receives a signal from a detection tag provided to an object, the detector generates detection result data including a unique tag ID which is assigned to the detection tag and a device ID which is assigned to the detector, and in which the position data processor processes the detection result data acquired from the detector and arrangement data of the detector in order to specify a position of the object.

10 Claims, 10 Drawing Sheets

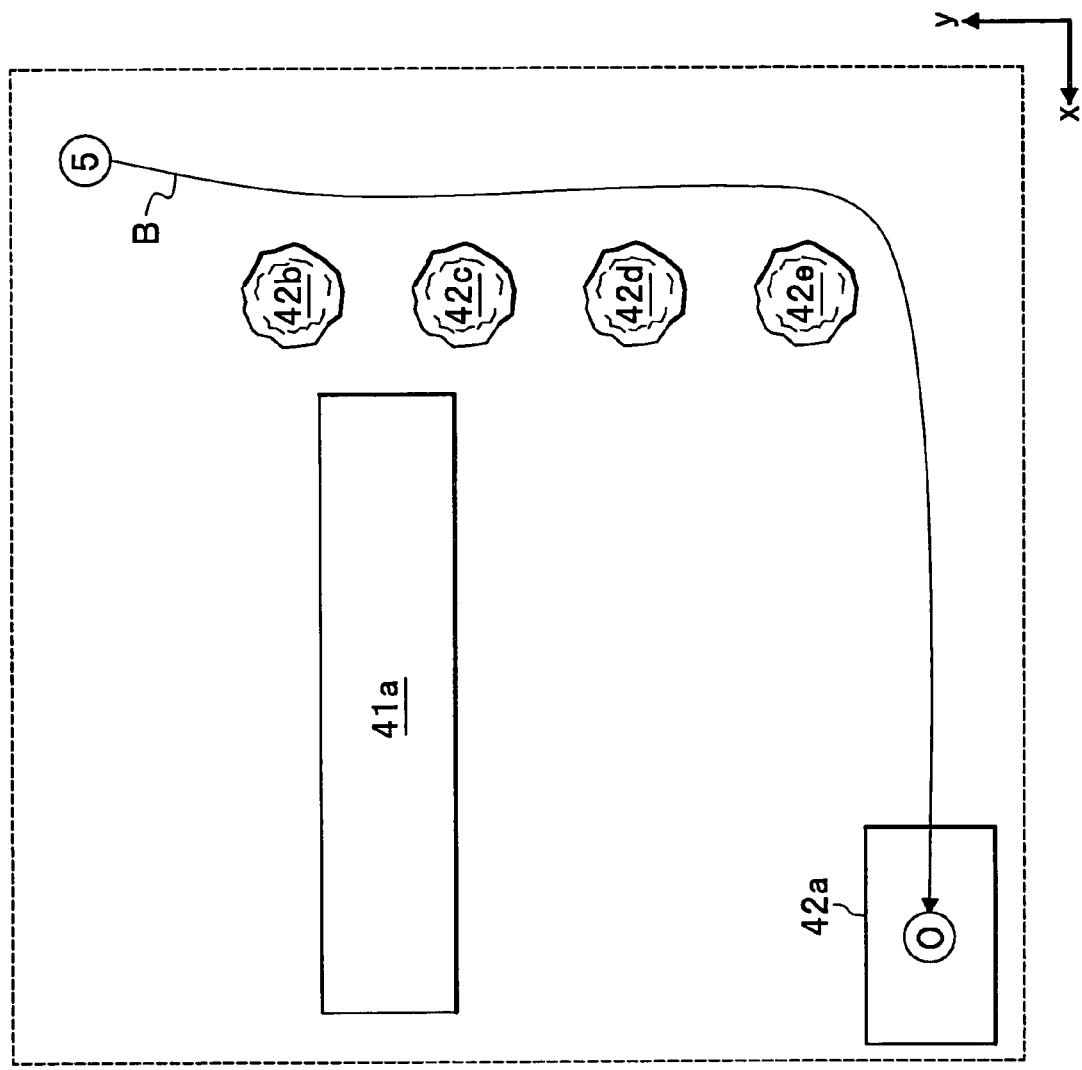

POSITION MANAGEMENT SYSTEM AND POSITION MANAGEMENT PROGRAM

CROSS REFERENCE TO RELATED APPLICATIONS

This application claims the foreign priority benefit under Title 35, United States Code, §119(a)-(d) of Japanese Patent Application No. 2005-202292, filed on Jul. 11, 2005 in the Japan Patent Office, the disclosure of which is herein incorporated by reference in its entirety.

BACKGROUND OF THE INVENTION

1. Field of the Invention

The present invention relates to a position management system and a position management program, and more specifically, to a position management system and a position management program to detect a position and so on of each of a plurality of objects to be detected based on information from a tag which is provided to the object corresponding to characteristics of the object.

2. Description of the Related Art

Conventionally, there are various well-known technologies which use tags to detect positions of objects to be detected. For instance, in a technology described in JP2001-183455A, a plurality of ID tags are arranged in a floor face keeping predetermined spaces. In addition, an ID reader is attached to an object whose position is to be detected such as a mobile object or the like. Thus, the ID reader reads ID data from the plurality of ID tags to detect the position of the object to be detected.

Moreover, as a method to detect a position of an object to be detected, a method which analyzes camera images, a method which uses ultrasonic waves or infrared radiations, a method which uses RFID tags, and so on are generally employed.

However, the methods in the prior art cannot always specify a position of an object to be detected with high accuracy due to the following problems.

For instance, the technology described in JP2001-183455A can detect a two-dimensional position of an object to be detected but not a three-dimensional position of the object. Therefore, it is considered to be difficult to make a robot perform operations and movements which require detection of three-dimensional positions.

Moreover, in the method which analyzes camera images or the method which uses ultrasonic waves or infrared radiations, there is an occlusion problem. More specifically, when there is another object (an obstacle) other than an object to be detected between the object to be detected and a detector such as a camera, an ultrasonic detector, or an infrared detector, the detector cannot detect the position of the object to be detected which is placed behind the obstacle. Accordingly, none of the methods can always specify a position of an object to be detected with high accuracy.

In addition, detecting positions of a plurality of objects to be detected only using camera images causes not only increase in computational cost but also insufficient accuracy in detecting positions depending on photoenvironments such as lighting.

Moreover, as one of methods which analyze camera images, there is a well-known method which searches for a marker attached on an object to be detected in order to detect the position of the object. However, only by using the marker, the method generally cannot acquire specific information of the object to be detected such as a shape, a weight, and so on though the method can acquire the position of the object to be detected.

Meanwhile, in a position detection system which uses ultrasonic tags or infrared tags, the tags need to be powered from an external power supply. However, the tags might not be powered from an external power supply depending on sizes or positions in a detection space of the objects to which the tags are attached. In such cases, it is impossible to use the ultrasonic tags or the infrared tags. Therefore, it is impossible to detect positions of the tags. Furthermore, it is not appropriate to attach tags which need to be powered from an external power supply to objects which are frequently moved such as a glass, a chair, and a book.

SUMMARY OF THE INVENTION

In view of above-mentioned problems, it is an object of the present invention to provide a position management system and a position management program which acquire three-dimensional position information of various objects to be detected with higher accuracy in a space where detection of positions is required.

In one aspect of the present invention to solve the above-mentioned problems, there is provided a position management system including two or more types of detection tags provided to objects whose positions are to be detected, detectors provided corresponding to the detection tags, and a position data processor. In the position management system, the detection tags complement detection abilities with each other. In addition, when a detector receives a signal from a detection tag provided to an object, the detector generates detection result data including a unique tag ID which is assigned to the detection tag and a device ID which is assigned to the detector. Moreover, the position data processor processes the detection result data acquired from the detector and arrangement data of the detector in order to specify a position of the object.

Here, in the present invention, the "two or more types of detection tags" are detectors which complement their detection abilities with each other. For instance, in case of using two types of detection tags, a combination of ultrasonic tags and RFID tags is preferred. The ultrasonic tag has problems such as an occlusion problem and requiring external power supply while the RFID tag does not. On the other hand, the RFID tag does not have high accuracy in detecting positions while the ultrasonic tag does. Therefore, at least one of the two or more types of detection tags is selected and attached to each of objects whose positions are to be detected. The type of detection tag is selected preferably in accordance with characteristics of each of the objects whose positions are to be detected and each of the types of the detection tags.

In such a configuration of a position management system in the present invention, the detector can receive a signal with high accuracy from the detection tag provided to the object whose position is to be detected. Accordingly, the detector can surely acquire a unique tag ID of the detection tag included in the signal. Therefore, the detector can generate detection result data including the acquired tag ID and its own device ID which has been stored in advance. Thus, the position data processor processes the acquired detection result data and arrangement data of the detectors to highly accu-

BRIEF DESCRIPTION OF THE DRAWINGS

FIG. 10 is a schematic diagram showing the path created using the artificial potential method.

DESCRIPTION OF THE PREFERRED EMBODIMENTS

One of advantages of the present invention is to apply a detection tag which is appropriate to characteristics of an object whose position is to be detected, such as how to use the object, where to use the object, and a size of the object. In this way, it is possible to prevent infeasible detection of the position of the object to be detected. Moreover, the position can be detected as accurately and reliably as possible. Next, the present invention will be described in detail referring to FIGS. 1-10.

(1) Embodiment of Position Management System

First of all, a position management system A according to an embodiment of the present invention will be described referring to FIGS. 1-3 as needed.

Figure 1:
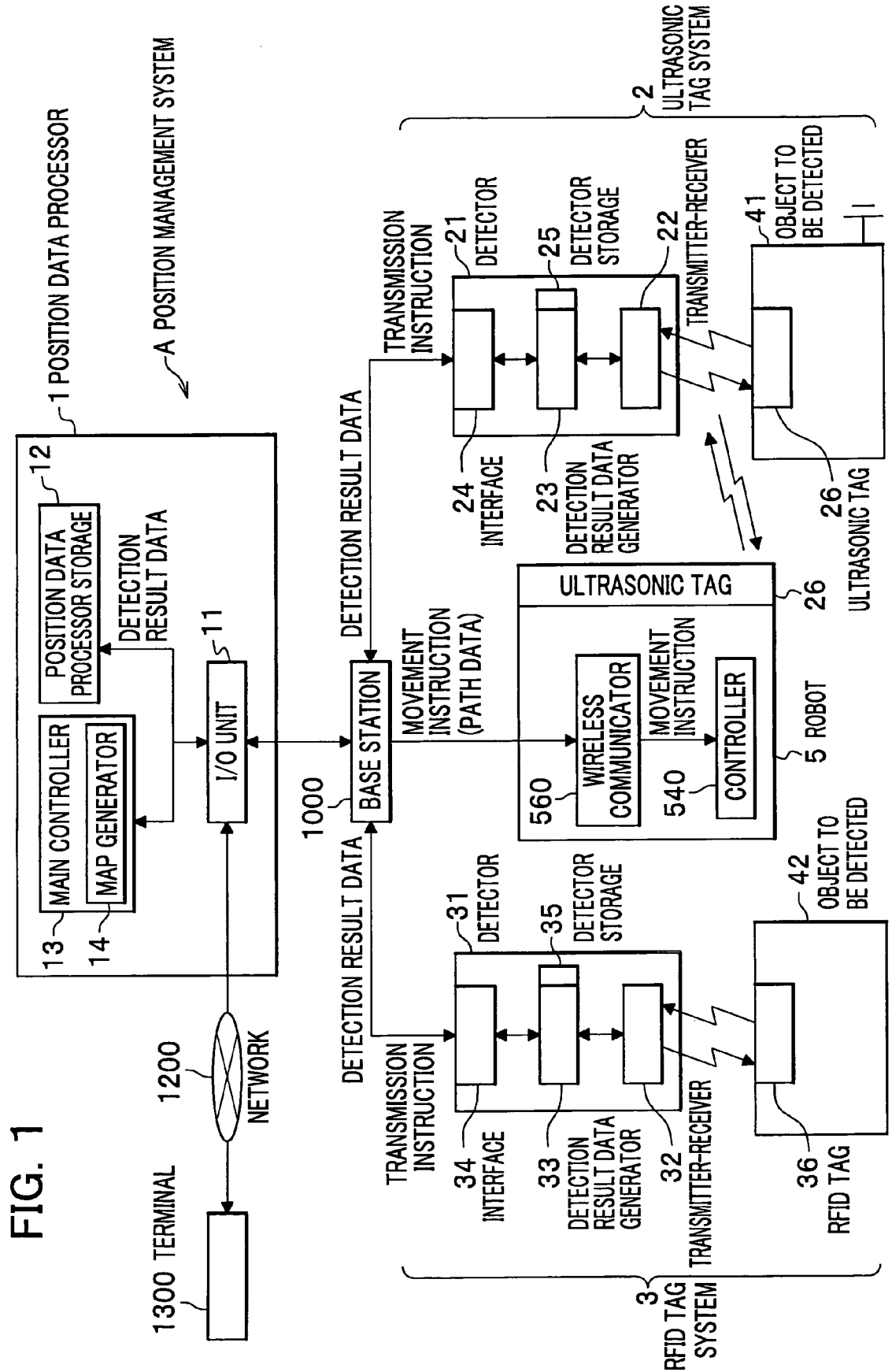
FIG. 1 is a configuration diagram illustrating principles of a position management system according to the present invention.

As shown in FIG. 1, the position management system A includes objects 41 and 42 whose positions are to be detected and a robot 5 which is an autonomous mobile object, an ultrasonic tag 26 and an RFID tag 36 which are provided to the objects 41 and 42 and the robot 5 and which are used to detect positions of the objects 41 and 42 and the robot 5, an ultrasonic tag detector 21 and an RFID tag detector 31 (respectively referred as simply a "detector 21" and a "detector 31", hereafter) which are provided respectively corresponding to types of the ultrasonic tag 26 and the RFID tag 36, and a position data processor 1.

Moreover, the position data processor 1 of the position management system A includes a position data processor storage 12 which holds detection result data, arrangement data, and so on, an I/O unit 11 which is connected with a terminal 1300 through a network 1200, and a main controller 13 including a map generator 14. The I/O unit 11 transmits and receives transmission instructions and the detection result data, for instance, to and from the detectors 21 and 31 and the robots 5.

Here, in the present invention, a detection system which uses the ultrasonic tag 26 and the detector 21 is referred to as an ultrasonic tag system 2. In addition, a detection system which uses the RFID tag 36 and the detector 31 is referred to as an RFID tag system 3.

Applying such a configuration of the position management system A improves accuracy and reliability of navigation and manipulation operations of a mobile object.

The position management system A using the ultrasonic tag system 2 and the RFID tag system 3 will be described, below.

(2) Ultrasonic Tag System and RFID Tag System (2-1) Ultrasonic Tag and RFID Tag

The ultrasonic tag 26 and the RFID tag 36 are employed as "two or more types of detection tags" described in the claims. The detectors 21 and 31 are employed as "detectors" provided corresponding to the two or more types of detection tags described in the claims.

A general-purpose ultrasonic tag and RFID tag can respectively be used as the ultrasonic tag 26 and the RFID tag 36.

The ultrasonic tag system 2 using the ultrasonic tag 26 can measure a position of the object 41 with very high accuracy of several centimeters. Therefore, in view of accuracy of the position, it is considered that all detection tags are preferably to be the ultrasonic tags 26. However, the ultrasonic tag 26 needs to be powered all the time to receive radio wave signals including transmission instructions and transmit ultrasonic wave signals. Therefore, in the present invention, as shown in FIGS. 2 and 3, the ultrasonic tag 26 is provided to objects to be detected where the ultrasonic tag 26 can be always connected with an external power supply, such as the object 41 (an equipped bookshelf 41$a$), and a wall.

In the present embodiment, an object to be detected having the ultrasonic tag 26 is referred to as an "object 41" while an object to be detected having the RFID tag 36, which will be described later, is referred to as an "object 42". Therefore, the robot 5 is included in a category of objects 41 when categories are classified as described above.

The ultrasonic tag system 2 with the ultrasonic tag 26 uses a frequency band of 20 kHz or higher (for instance, 40 kHz). The frequency band is selected as needed to achieve excellent detection performance of positions corresponding to communication environments and so on.

On the other hand, compared with the ultrasonic tag system 2, the RFID tag system 3, which uses the RFID tag 36, has less accuracy in measuring a position of the object 42. However, no power supply is necessary since the RFID tag 36 can generate power by receiving a radio wave transmitted from the detector 31. Therefore, in the present invention, the RFID tag 36 is provided to objects to be detected where it is difficult to supply power and which move, such as a human, a pot plant, and a document, for instance. It is possible to provide the RFID tag 36 to a human by attaching a nameplate which has the RFID tag 36, for instance.

The RFID tag system 3 using the RFID tag 36 uses a frequency band such as 860-960 MHz and 2.45 GHz, for instance. Even when there is an obstacle between a transmitter and a receiver, communication remains available with higher possibility since radio waves used in the RFID tag system 3 tend to more easily diffract compared with ultrasonic waves.

(2-2) Detector

The detector 21 acquires ultrasonic wave signals including a unique tag ID from the ultrasonic tag 26 within a predetermined distance. Then, the acquired ultrasonic wave signals are used to detect a position of the ultrasonic tag 26 with high accuracy.

In addition, one or more detectors 31 receive signals from a specific RFID tag 36 so that a position of the RFID tag 36 can be comparatively roughly estimated since a communication area of the RFID tag 36 has been known in advance.

The detectors 21 or 31 only need to be able to transmit and receive signals to and from the ultrasonic tag 26 or the RFID tag 36 through wireless communication. Therefore, general-purpose detectors may be used as the detectors 21 and 31.

As shown in FIG. 1, the detectors 21 and 31 respectively include transmitter-receivers 22 and 32, detection result data generators 23 and 33, and interfaces 24 and 34.

(2-3) Transmitter-Receiver

The transmitter-receivers 22 and 32 include antennas and so on. In addition, the transmitter-receiver 22 transmits radio wave signals including transmission instructions to the ultrasonic tags 26 and receives ultrasonic wave signals including the unique tag IDs from the ultrasonic tags 26. Moreover, the transmitter-receiver 32 transmits radio wave signals including transmission instructions to the RFID tags 36 and receives radio wave signals including the unique tag IDs from the RFID tags 36.

(2-4) Detection Result Data Generator

The detection result data generators 23 and 33 generate detection result data based on signals received from the ultrasonic tag 26 and the RFID tag 36, respectively. Detector storages 25 and 35 hold necessary information of the detectors 21 and 31 such as ID information.

The detection result data generators 23 and 33 can be implemented by adding general CPUs to the detectors 21 and 31.

(2-5) Interface

The interfaces 24 and 34 receive the transmission instructions transmitted from the position data processor 1 and transmit the detection result data acquired from the detection result data generators 23 and 33 respectively to the position data processor 1.

(3) Position Data Processor

Next, the position data processor 1, which is an essential part of the position management system A, will be described referring to FIGS. 1-4 as needed. FIG. 4 is a block diagram of the position data processor 1 in the position management system A.

As shown in FIG. 4, the position data processor 1 includes an I/O unit 11, a position data processor storage 12, and a main controller 13 including a map generator 14 and a path planner 15.

(3-1) I/O Unit

As shown in FIGS. 1 and 4, the I/O unit 11 is an interface to transmit and receive various data from and to the robot 5, the terminal 1300, and so on through a base station 1000 and a network 1200.

(3-2) Position Data Processor Storage

The position data processor storage 12 includes an autonomous mobile object data storage 121 and a tag information storage 122. Thus, the position data processor storage 12 holds the above-mentioned detection result data acquired from the ultrasonic tag systems 2 and the RFID tag systems 3, as well as various data to control the robot 5.

(3-2-1) Autonomous Mobile Object Data Storage

The autonomous mobile object data storage 121 associates autonomous mobile object data which are data about a state of the robot 5, with the robot 5 (each of the robots 5 when there are a plurality of robots 5) and stores autonomous mobile object data in a database.

The autonomous mobile object data include at least a robot ID, a current position, and movement velocity. In addition, the autonomous mobile object data include data about a size, a battery remaining amount, whether there is a drive system malfunction, and path data created by a main controller 13, which will be described later, of the robot 5, and so on. Also, the path data and how to create the path data will be described in detail later.

Moreover, the autonomous mobile object data storage 121 also holds various task data, which are input from the terminal 1300, about tasks which the robot 5 is made to execute.

(3-2-2) Tag Information Storage

The tag information storage 122 holds the detection result data acquired from the detectors 21 and 31, the arrangement data of the detectors 21 and 31, and so on.

(3-3) Main Controller

The main controller 13 performs various operations in accordance with programs previously stored in the position data processor storage 12 and the like.

Figure 6:
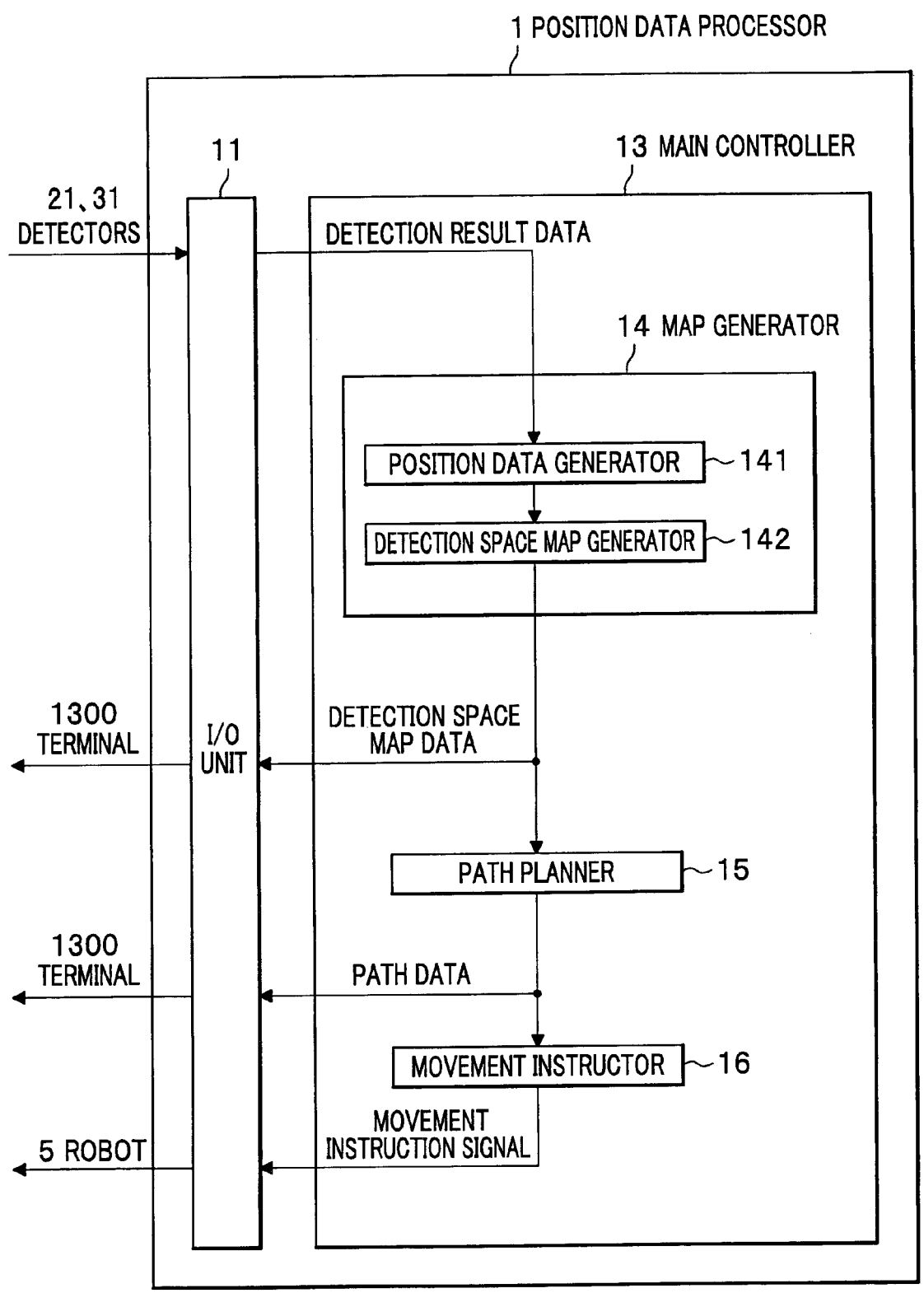
FIG. 6 is a block diagram of a main controller in the position data processor.

As shown in FIGS. 4 and 6, the main controller 13 includes a map generator 14, as well as a path planner 15 and a movement instructor 16 as needed.

The main controller 13 can be implemented by a general CPU.

By the way, the position data processor storage 12 is omitted and not shown in FIG. 6. Moreover, the movement instructor 16 is omitted and not shown in FIG. 4.

(3-3-1) Map Generator

The map generator 14 generates a detection space map based on the detection result data acquired from the detectors 21 and 31.

Here, in the present invention, a "map" is a set of data to express positions of detected objects. The "positions" may be expressed by coordinates as a matter of course, as well as by other data which can specify positional relationship, such as detector IDs.

As shown in FIG. 6, the map generator 14 includes a position data generator 141 and a detection space map generator 142. How the map generator 14 generates the detection space map, and so on will be described in detail later.

(3-3-2) Path Planner

In a case of navigating the robot 5, the path planner 15 creates the path data of the robot 5 based on the detection space map generated by the map generator 14.

How the path planner 15 creates the path of the robot 5, and so on will be described in detail later.

(4) Robot

Figure 5:
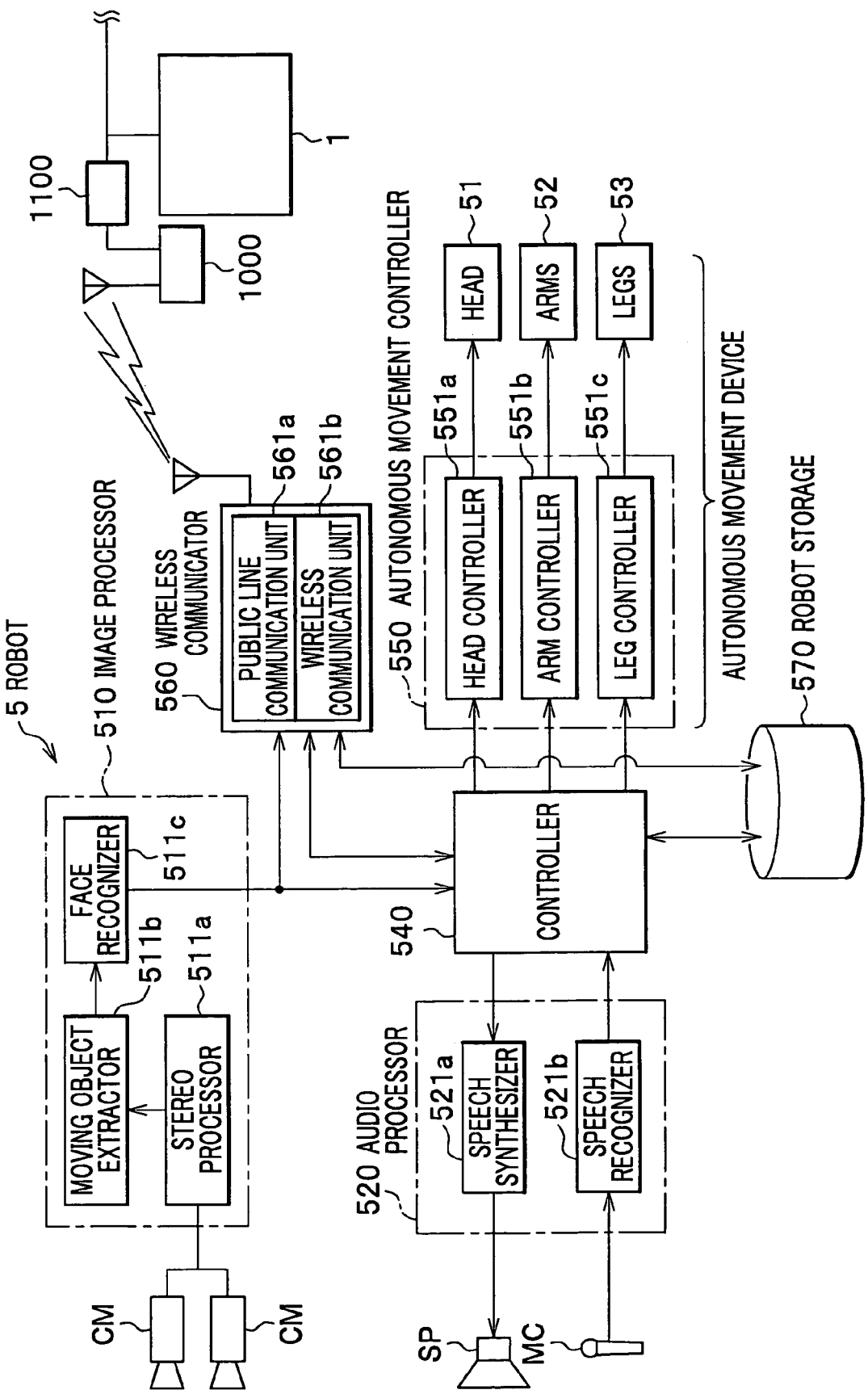
FIG. 5 is a block diagram showing a robot.

Next, the robot 5, which is an object to be detected and an autonomous mobile object, will be described referring to FIGS. 2 and 5. FIG. 5 is a block diagram showing the robot 5 in FIG. 2.

Figure 2:
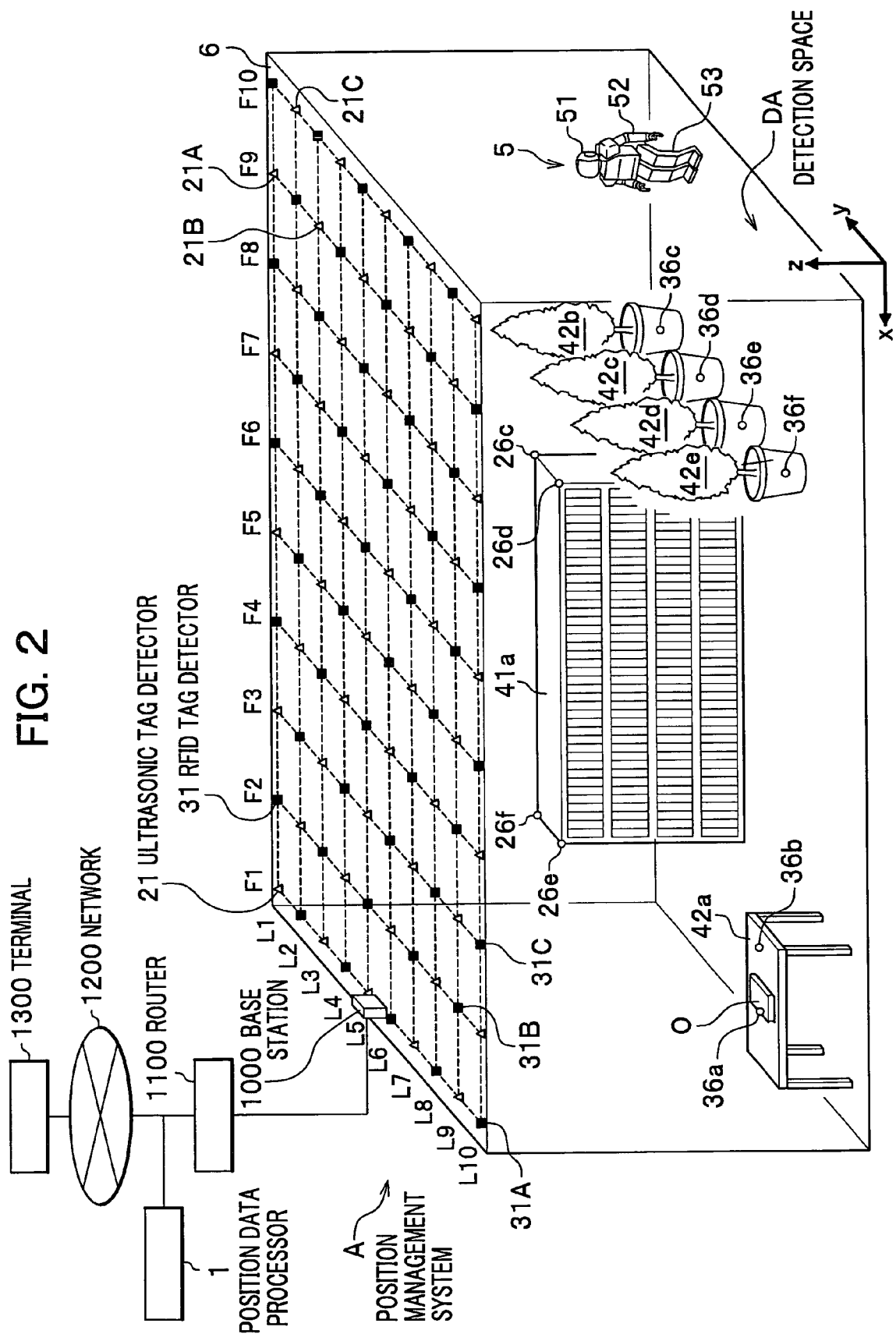
FIG. 2 is a configuration diagram showing configuration of a position management system according to an embodiment of the present invention.

The robot 5 shown in FIG. 2 is a two-legged autonomous mobile robot.

The robot 5, which is placed in the detection space DA, moves around in the detection space DA based on the path data transmitted from the main controller 13 of the position data processor 1. In addition, the robot 5 executes various tasks based on task execution instruction signals which are transmitted separately.

As shown in FIG. 2, the robot 5 includes a head 51, arms 52, and legs 53. Actuators respectively drive the head 51, the arms 52, and the legs 53. An autonomous movement controller 550 (see FIG. 5) controls two-legged movement. The two-legged movement is described in detail in JP 2002-326173A and JP 2004-299025A, for instance.

As shown in FIG. 5, besides the head 51, the arms 52, and the legs 53, the robot 5 includes cameras CM, a speaker SP, a microphone MC, an image processor 510, an audio processor 520, a controller 540, the autonomous movement controller 550, a wireless communicator 560, and a robot storage 570.

(4-1) Camera

The cameras CM can take images as digital data. For instance, color CCD (Charge-Coupled Device) cameras may be used as cameras CM. The cameras CM, which are arranged in right and left sides in parallel, output taken images to the image processor 510. All of the cameras CM, the speaker SP, and the microphone MC are arranged in the head 51.

When the robot 5 approaches a document O, which is a target, with being navigated by the position management system A, the robot 5 can directly confirm the document O using the cameras CM.

(4-2) Image Processor

The image processor 510 processes images taken by the cameras CM and recognizes an obstacle, a target, or a human in the surroundings in order to know the surrounding circumstances. The image processor 510 includes a stereo processor 511a, a moving object extractor 511b, and a face recognizer 511c.

The stereo processor 511a matches patterns of two images taken by the right and left cameras CM based on one of the two images. Then, the stereo processor 511a calculates parallax between corresponding pixels in the two, right and left, images to generate a parallax image and outputs the two original images and the generated parallax image to the moving object extractor 511b. The parallax indicates a distance between the robot 5 and the object whose images have been taken.

The moving object extractor 511b extracts a human in the images taken by the right and left cameras CM based on the data output from the stereo processor 511a. Since it is assumed that the moving object is a human, the moving object extractor 511b extracts the moving object which is to be recognized as a human.

The moving object extractor 511b stores images of the last several frames (scenes) in order to extract the human. Thus, the moving object extractor 511b compares the latest frame (image) with the other frames (images) to match patterns of the images and calculates an amount of movement for each pixel to generate movement images. Then, when there is a pixel having a large amount of movement within a predetermined range from the cameras CM, the moving object extractor 511b assumes that there is a human in a position of the pixel based on the parallax image and the movement images. Moreover, the moving object extractor 511b extracts the human as a parallax image only within the predetermined range and outputs the image of the human to the face recognizer 511c.

The face recognizer 511c extracts skin-colored portions from the image of the human to recognize a position of a face based on sizes, shapes, and so on of the skin-colored portions. Similarly, positions of hands are recognized based on sizes, shapes, and so on of the skin-colored portions.

The recognized position of the face is output to the controller 540, as well as to the wireless communicator 560 to be transmitted to the position data processor 1 through the base station 1000. Thus, the position of the face is used as information for the robot 5 to move and to communicate with the human.

(4-3) Audio Processor

The audio processor 520 includes a speech synthesizer 521a and a speech recognizer 521b.

The speech synthesizer 521a generates audio data from text information based on a speech instruction determined and output by the controller 540 and outputs the audio data to the speaker SP. Correspondences between text information and audio data are stored in advance and used to generate the audio data.

The speech recognizer 521b generates text information from audio data input through the microphone MC based on correspondences, which are stored in advance, between audio data and text information, and outputs the text information to the controller 540.

(4-4) Controller

The controller 540 generates signals which are transmitted to the position data processor 1, which will be described later. In addition, the controller 540 controls each part (the image processor 510, the audio processor 520, the autonomous movement controller 550, and the wireless communicator 560) of the robot 5 in accordance with movement instruction signals along with the path data and various task instruction signals output from the position data processor 1.

The controller 540 can be implemented by a general CPU.

The controller 540 periodically generates robot state data and outputs the robot state data to the wireless communicator 560. The robot state data include a robot ID and movement indicating data and are transmitted to the position data processor 1 through the wireless communicator 560.

The movement indicating data are data indicating whether the robot 5 is moving. For instance, while the leg controller 551c is driving the legs 53, "moving" is set to the movement indicating data. On the other hand, while the leg controller 551c is not driving the legs 53, "not moving" is set to the movement indicating data.

(4-5) Autonomous Movement Controller

The autonomous movement controller 550 includes a head controller 551a, an arm controller 551b, and the leg controller 551c.

The head controller 551a, the arm controller 551b, and the leg controller 551c respectively drive the head 51, the arms 52, and the legs 53 in accordance with instructions from the controller 540.

(4-6) Wireless Communicator

The wireless communicator 560 is a communication unit which transmits and receives data to and from the position data processor 1. The wireless communicator 560 includes a public line communication unit 561a and a wireless communication unit 561b.

The public line communication unit 561a is a wireless communicator using public lines such as mobile phone lines and PHS (Personal Handyphone System) lines.

Meanwhile, the wireless communication unit 561b is a wireless communicator using short-range wireless communications such as wireless LANs which complies with IEEE802.11b standards.

The wireless communicator 560 selects either of a public line communication unit 561a or a wireless communication unit 561b to communicate data with the position data processor 1 in response to a connection request from the position data processor 1.

(4-7) Robot Storage

Various data necessary to control movements of the robot 5 are stored in the robot storage 570. In other words, the path data transmitted from the position data processor 1 are stored in the robot storage 570. In addition, the arrangement data of the detectors 21 and 31 may be stored in the robot storage 570. It is possible to update the path data stored in the robot storage 570 through the wireless communicator 560.

The robot 5 with such a configuration moves to reach the document O, which is the target, in accordance with the path data stored in the robot storage 570 with various controls. At this time, the robot 5 can compare the position data of the robot 5 transmitted from the position data processor 1 and the path data, the arrangement data, and so on stored in the robot storage 570 to adjust movement direction if necessary, while moving.

When having reached the document O, which is the target, the robot 5 checks the document O for final confirmation using cameras CM. At this time, the robot 5 executes various tasks if necessary.

The robot 5 executes various tasks such as collecting the document O, for instance. In addition, in a case where the target is a human or the like having the RFID tag 36, the robot may perform tasks such as saying "Mr./Ms. XX, the reception is this way. I will guide you." and/or presenting a company.

(5) Example of Position Management System and Detecting Position of Object To Be Detected (5-1) Example of Position Management System Next, there will be described in detail an example of the position management system A which includes the ultrasonic tag system 2 and the RFID tag system 3 and the robot 5. In addition, how to detect the positions of the objects 41 and 42 in the example of the position management system A will also be described in detail.

As shown in FIG. 2, in an example of the position management system A according to the present invention, a plurality of the detectors 21 and the detectors 31 are arranged in a ceiling 6 in grids in the detection space DA. In the detection space DA, there are arranged the robot 5 where the ultrasonic tags 26*a* and 26*b* (see FIG. 3) are provided, the document O which is the target and where the RFID tag 36*a* is provided, the equipped bookshelf 41*a* which is the obstacle and where the ultrasonic tags 26*c*-26*f* are provided, and a desk 42*a* and pot plants 42*b*-42*e* which are obstacles and where the RFID tags 36*b*-36*f* are provided.

In the example shown in FIG. 2, the ultrasonic tags 26*a*-26*f* are provided to the bookshelf 41*a* (the object 41) and the robot 5 where external power can be supplied. On the other hand, the RFID tags 36*a*-36*f* are provided to the document O, the desk 42*a*, and the pot plants 42*b*-42*e* (the objects 42) where external power cannot be supplied.

Moreover, in the position management system A, both of the detectors 21 and 31 are arranged in grids with spaces of 50 cm in the ceiling 6 of the detection space DA. The spaces between the detectors 21 and 31 are determined corresponding to an area of the detection space DA, communication distances of the tag systems which are to be used, the number of objects 41 and 42 in the detection space DA, and so on. In the present embodiment, the detectors 21 and 31 are alternately arranged. In such an arrangement of the detectors 21 and 31, the different types of tag systems 2 and 3 can detect positions of the objects 41 and 42 with higher possibility since communication is not obstructed by the obstacles. Moreover, arrangement position of the detectors 21 and 31 can be easily stored and retrieved since both of the detectors 21 and 31 are arranged in grids with even spaces.

In the position management system A according to the present invention, arrangement density of the detectors 21 and 31 in the ceiling 6 can be changed corresponding to a shape of the detection space DA, accuracy requirement for detecting positions, and so on.

Figure 3:
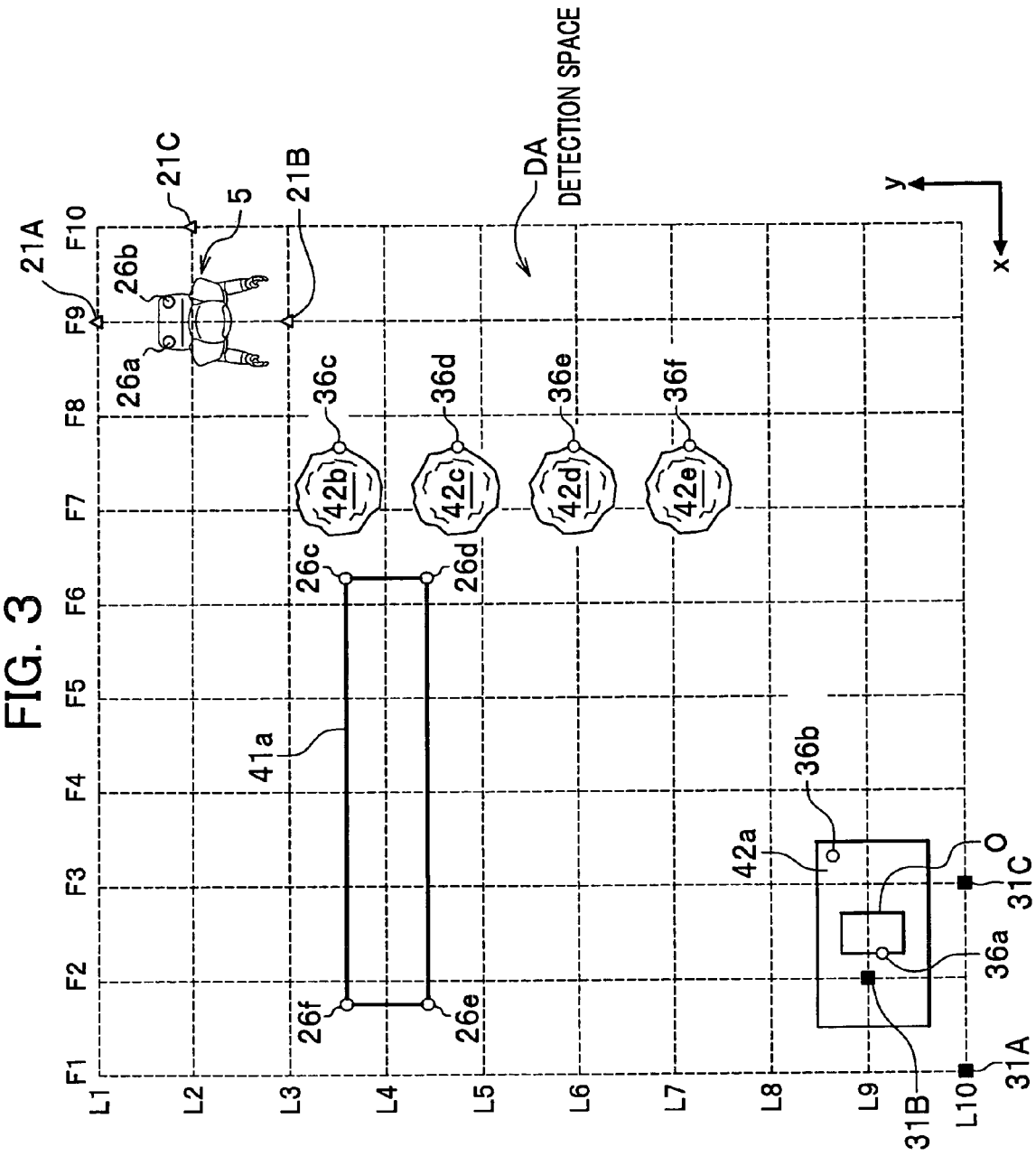
FIG. 3 is a plan view showing positional relationship in the position management system according to the embodiment.
Figure 4:
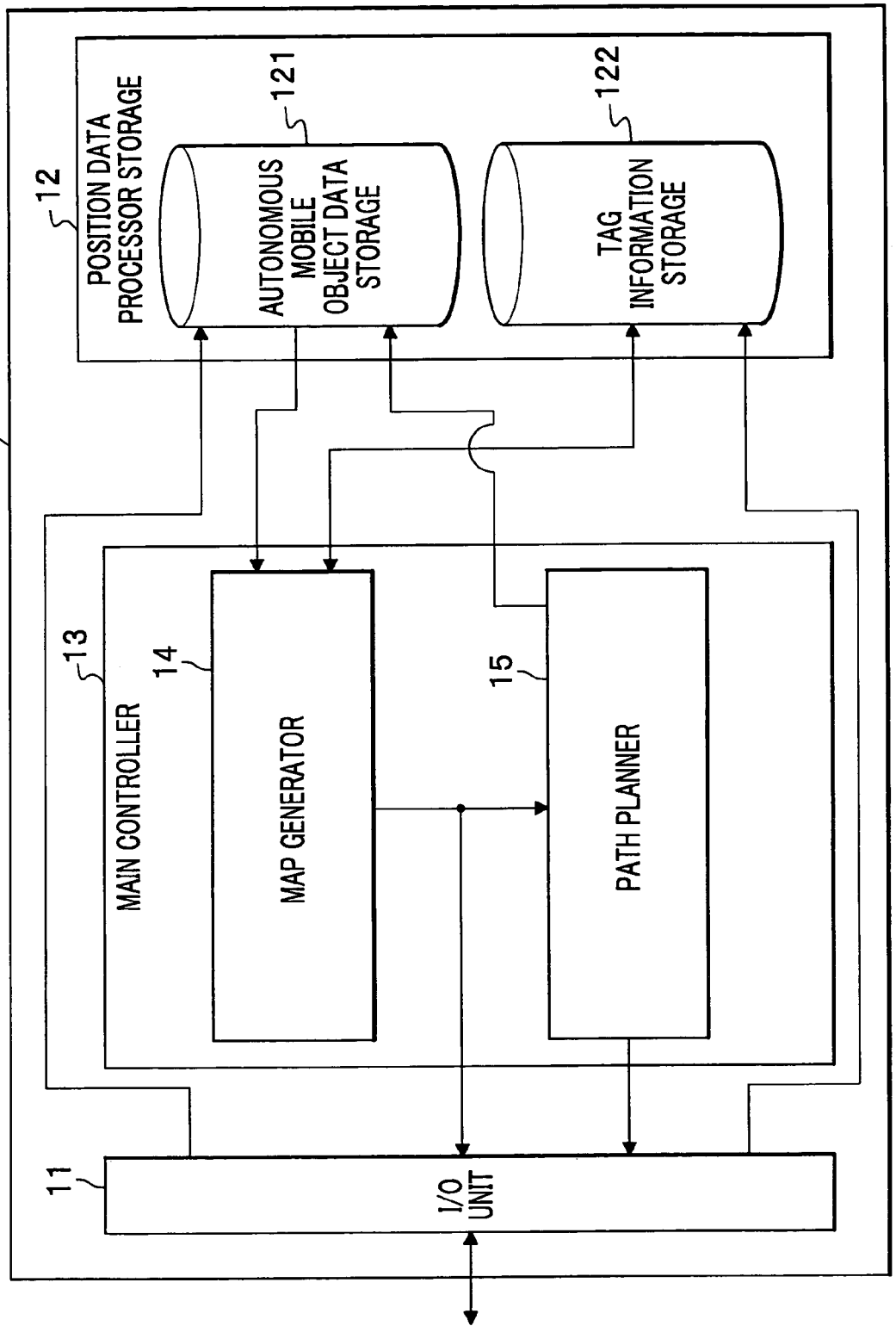
FIG. 4 is a block diagram of a position data processor in the position management system.

As shown in FIGS. 2 and 3, in the position management system A with such a configuration, three arbitrarily selected detectors 21 which are not on the same line are used to detect the positions of the robot 5 and the other objects 41 where the ultrasonic tags 26 are provided.

For instance, detectors 21A, 21B and 21C which are not on the same line can be used to detect the positions of the ultrasonic tag 26*a* and the ultrasonic tag 26*b* provided to the robot 5.

Here, reference characters "A", "B", "C" given to the detectors 21 indicate that the detectors 21 are placed in different positions.

(5-2) Detecting Position of Object to be Detected

Next, there will be described how to measure the position of the ultrasonic tag 26*a* in the position management system A according to the present invention, below. A similar method can also be used to measure the positions of the ultrasonic tags 26*b* and the other ultrasonic tags.

As shown in FIGS. 2 and 3, any three detectors 21A, 21B, and 21C which detect a same signal and are not on a same line are selected from a plurality of the detectors 21 provided in grids {(F1×L1), . . . , (F10×L10)} in the detection space DA. Then, the well-known trilateration method is applied to a distance between the ultrasonic tag 26 and each of the three detectors 21A, 21B, and 21C and coordinates of each of the detectors 21A, 21B, and 21C to calculate the position of the ultrasonic tag 26*a*.

In other words, the position data generator 141 (see FIG. 6) of the map generator 14 solves simultaneous equations in the trilateration method, which are shown as the following formulas (1)-(3), based on such arrangement data and the detection result data from the detectors 21. Thus, the position data generator 141 can calculate the positions of the robot 5 and the objects 41 in the detection space DA.

$$(X_A-x)^2+(Y_A-y)^2+(Z_A-z)^2=1_A^2 \quad (1)$$

$$(X_B-x)^2+(Y_B-y)^2+(Z_B-z)^2=1_B^2 \quad (2)$$

$$(X_C-x)^2+(Y_C-y)^2+(Z_C-z)^2=1_C^2 \quad (3)$$

Here, $(X_A, Y_A, Z_A)$, $(X_B, Y_B, Z_B)$, and $(X_C, Y_C, Z_C)$ are respectively coordinates of the detectors 21A, 21B, and 21C in the detection space DA.

In addition, (x, y, z) is coordinates of the detected ultrasonic tag 26*a* in the detection space DA.

Moreover, $1_A$, $1_B$, and $1_C$ are respectively distances between the detected ultrasonic tag 26*a* and the detectors 21A, 21B, and 21C.

One or more detectors 31 receive a signal from a specific RFID tag 36 so as to comparatively roughly estimate the position of the RFID tag 36 since the detectors 31 have known the communication area of the RFID tag 36 in advance.

(6) Operations of Ultrasonic Tag System and RFID Tag System

Next, operations of the ultrasonic tag system 2 and the RFID tag system 3 will be described referring to FIGS. 1-3 as needed.

(6-1) Operation of Ultrasonic Tag System

As shown in FIG. 1, in the ultrasonic tag system 2, the main controller 13 calls the interface 24. In response to this, the transmitter-receiver 22 outputs radio wave signals including an ultrasonic wave transmission instruction. The ultrasonic tag 26 receives radio wave signals including the ultrasonic wave transmission instruction and transmits ultrasonic wave signals including its own unique ID (tag ID) to the transmitter-receiver 22.

The detection result data generator 23 measures time from when the ultrasonic wave transmission instruction is transmitted from the interface 24 until the transmitter-receiver 22 receives data of the object to be detected which are transmitted on the ultrasonic wave signals, in order to calculate a distance 1 between the ultrasonic tag 26 and the transmitter-receiver 22.

As shown in FIG. 3, it is possible to acquire direction of the robot 5 using positions of the objects measured by the detectors 21 since the ultrasonic tags 26a and 26b are provided in two corners of a back computer case of the robot 5.

In addition, the robot 5 can move accurately without bumping into the wall since the ultrasonic tags 26 (not shown) are provided in the wall of the room, where power can be supplied.

The detection result data generator 23 generates the detection result data including the distance 1 between the ultrasonic tag 26 and the detector 21 calculated as described above, the tag ID, and the device ID of the detector 21. Then, the detection result data generator 23 outputs the detection result data to the position data processor 1, which will be described later, through the interface 24.

Concerning the tag ID assigned to each of the ultrasonic tags 26, when the main controller 13 outputs the transmission instructions by means of the time-division multiplexing, only an ultrasonic tag 26 corresponding to the tag ID included in the transmission instruction from the main controller 13 transmits the ultrasonic wave signals. The main controller 13 may output the transmission instructions by means of the frequency division multiplexing instead of the time-division multiplexing. The time-division multiplexing and the frequency division multiplexing can be employed for transmission similarly in the RFID tag system 3, which will be described later.

Moreover, the position data processor 1 retrieves and acquires "specific information" (characteristics) including features such as a shape and a size of the object 41 to which the tag ID is assigned using the acquired tag ID. The specific information is stored in the tag information storage 122 in the position data processor storage 12. The specific information may be stored in advance in the detector storage 25 in the detector 21 so as to be included in the detection result data when the detection result data are generated.

(6-2) Operation of RFID Tag system

As shown in FIG. 1, in the RFID tag system 3, the main controller 13 calls the interface 34. In response to this, the interface 34 outputs an RFID transmission instruction. The RFID tag 36 receives the RFID transmission instruction and transmits radio wave signals including the tag ID of the RFID tag 36 to the transmitter-receiver 32.

The RFID tag 36 receives signals from the detector 31, generates power, and then transmits the tag ID to the detector 31. The detection result data generator 33 generates the detection result data including the tag ID of the RFID tag 36 and its own device ID (the detector ID) and outputs the detection result data to the position data processor 1.

Similarly to the case of using the ultrasonic tag 26 described above, the position data processor 1 retrieves and acquires "specific information" (characteristics) including features such as a shape and a size of the object 42 to which the tag ID is assigned using the acquired tag ID. Similarly to the ultrasonic tag system 2, the specific information is stored in the tag information storage 122 in the position data processor storage 12. The specific information may be stored in advance in the detector storage 35 in the detector 31 so as to be included in the detection result data when the detection result data are generated.

Unlike ultrasonic waves which travel very rectilinearly, radio waves transmitted from the RFID tag 36 tend to easily diffract. Therefore, even in a case where the document O with the RFID tag 36 is placed behind another object, the RFID tag system 3 can detect the position of the document O with higher possibility though the ultrasonic tag system 2 cannot detect the position of the document O at all in such a case.

Especially, in the position management system A according to the present invention, a plurality of the detectors 31 are arranged in the whole ceiling 6 of the detection space DA. In this case, some of the detectors 31 might not be able to detect the position of the RFID tag 36 because of an obstacle or the like. However, it is possible to prevent an occlusion problem since the position of the RFID tag 36 can be detected using the other detectors 31 and since radio waves can diffract.

In the position management system A, to the objects to be detected which might be placed behind the other objects, systems using radio waves which tend to diffract, such as the RFID tag systems 3 are provided so as to solve the occlusion problem. Moreover, systems which can detect three-dimensional positions with higher accuracy such as the ultrasonic tag systems 2 are provided to the objects to be detected where external power is supplied and which have no occlusion problem. As a result, it is possible to detect three-dimensional positions of various objects 41 and 42 in the detection space DA with high reliability and accuracy.

Applying the present invention which can recognize three-dimensional positions of various objects with higher accuracy improves accuracy and reliability of navigation and manipulation operations of a mobile object.

(7) Navigation of Robot (7-1) Example of Applying Position Management System

Next, there will be described an example of applying the position management system A according to the present invention, to navigate the robot 5, referring to FIGS. 2 and 3 as well as FIGS. 6-10 as needed.

Figure 7:
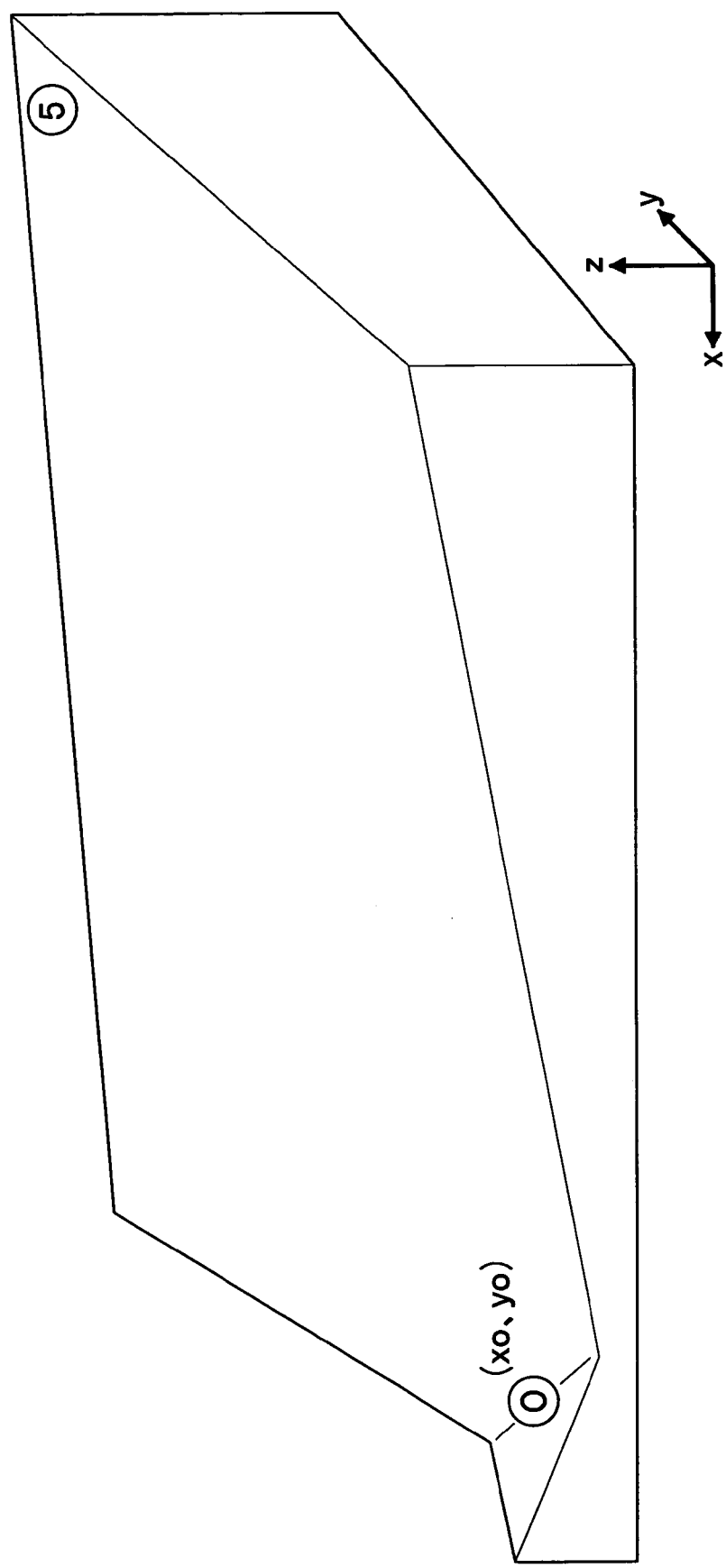
FIG. 7 is an explanatory diagram illustrating creation of a path of the robot.
Figure 8:
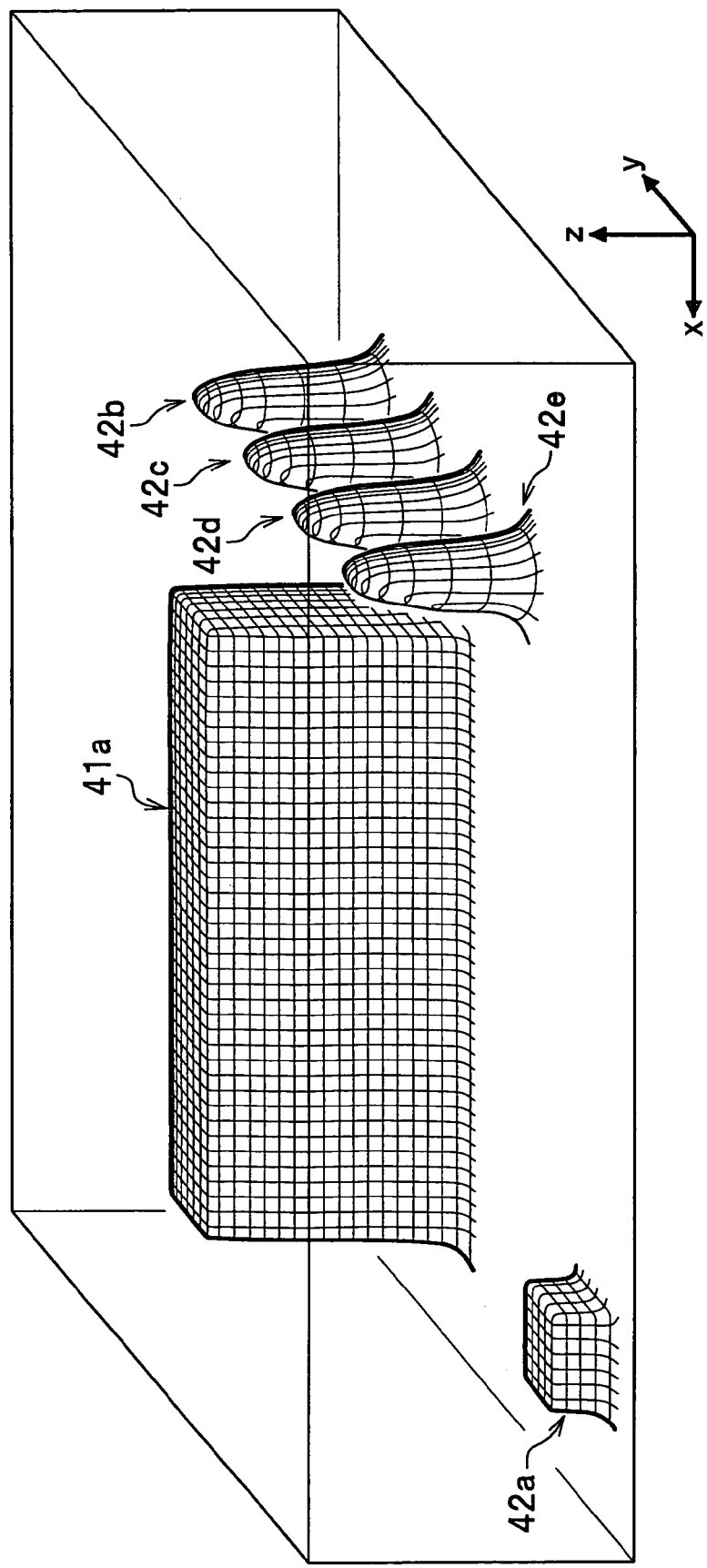
FIG. 8 is an explanatory diagram illustrating creation of the path of the robot.
Figure 9:
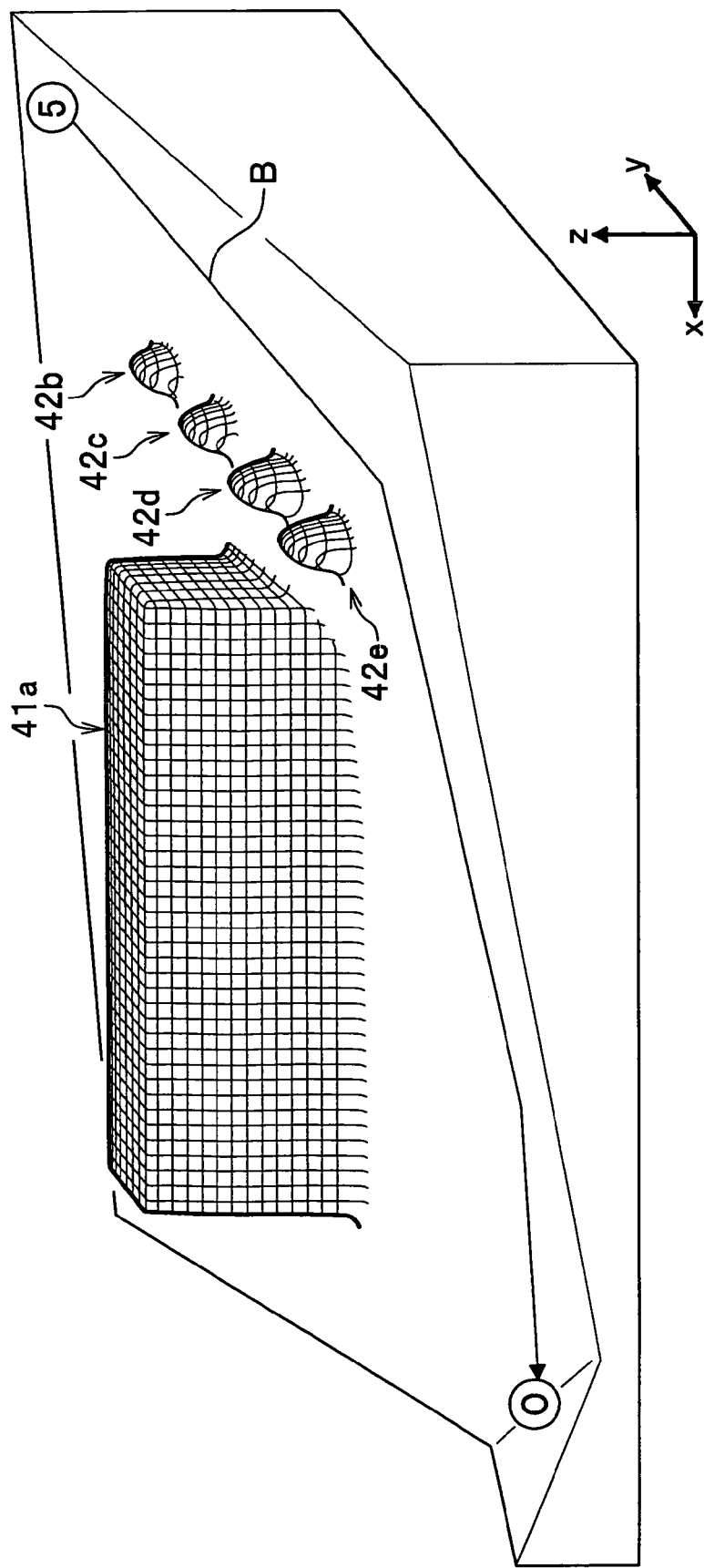
FIG. 9 is an explanatory diagram illustrating creation of the path of the robot.

FIG. 6 is a block diagram of the main controller of the position data processor. FIGS. 7-9 are explanatory diagrams illustrating creation of a path of the robot. FIG. 10 is a schematic diagram showing the path created by means of the artificial potential method.

In an example of applying the position management system A described below, the following is assumed: the ultrasonic tag system 2 or the RFID tag system 3 detects the positions of the objects 41 and 42, the robot 5, and the document O; then, the position data processor 1 creates a detection space map based on the detection results to create path data of the robot 5 based on the detection space map; after that, the position data processor 1 navigates the robot 5 to the document O placed in a predetermined position and makes the robot 5 to collect the document O. Here, in describing creation of a path B below, it is assumed that the document O is a target and the equipped bookshelf 41a and the pot plants 42b-42e are obstacles among the objects 41 and 42, the robots 5, and so on which are arranged in the detection space DA. However, the target and the obstacles may be changed depending on what kind of task instructions the robot 5 is made to execute.

As shown in FIG. 2, the position management system A includes the robot 5 placed in the detection space DA, the base station 1000, which is an access point of a wireless LAN or the like, connected with the robot 5 through wireless communication, the position data processor 1 such as a server, connected with the base station 1000 through a router 1100, the terminal 1300 connected with the position data processor 1 through the network 1200 such as a LAN or the like, the document O which is the target, the equipped bookshelf 41a, the desk 42a, and the pot plants 42b-42e.

In the example shown in FIG. 2, in navigation of the robot 5, the robot 5 needs to recognize its self-position with high accuracy. In addition, the robot 5 itself includes a battery. Accordingly, the robot 5 includes not the RFID tag 36 but the ultrasonic tags 26a and 26b. It is preferable that the ultrasonic tags 26a and 26b are placed in positions where no noise superimposes on transmitting-receiving waves in communication and where communication state is best. Therefore, in the present example, the ultrasonic tags 26a and 26b are provided in two corners of the back computer case of the robot 5 as shown in FIG. 3.

Next, there will be described an example of processes in which the position data processor 1 detects positions of objects 41 and 42 in the detection space DA, creates the path B of the robot 5, and outputs a movement instruction signal to the robot 5, referring to FIG. 6.

(7-2) Specifying Position of Object to be Detected (7-2-1) Acquiring Detection Result Data First of all, as shown in FIG. 6, the position data generator 141 acquires the detection result data transmitted from the detectors 21 and 31 through the I/O unit 11. The detection result data include unique tag IDs assigned to the ultrasonic tags 26 and the RFID tags 36, the specific data of the objects 41 and 42 corresponding to the tag IDs, and the device IDs.

(7-2-2) Reading Arrangement Data

The position data generator 141 reads the arrangement data which are stored in the tag information storage 122 (not shown in FIG. 6) and which express the arrangement position corresponding to the device IDs assigned to the detectors 21 and 31. Then, the position data generator 141 performs the following processes based on the arrangement data and the detection result data.

(7-2-3) Creating Position Data

The position data generator 141 matches the read arrangement data with the device IDs of the detectors 21 and 31 included in the acquired detection result data. Then, the position data generator 141 calculates each of the positions of the ultrasonic tags 26 and the RFID tags 36 in the detection space DA by means of the above-mentioned trilateration method or the like to create the position data and outputs the position data to the detection space map generator 142.

(7-2-4) Creating Detection Space Map

Next, the detection space map generator 142 creates the detection space map based on the input positions (the position data) of the ultrasonic tags 26 and/or the RFID tags 36 and the arrangement data and outputs the created detection space map.

(7-2-5) Outputting Detection Space Map

Then, the detection space map generator 142 outputs the created detection space map to the terminal 1300 and the tag information storage 122. As a result, a user can check arrangement of the objects in the detection space DA through the terminal 1300. Moreover, in a case where the path is to be planned, the detection space map generator 142 outputs the detection space map to the path planner 15.

The positions of the objects in the detection space DA are detected, and the detection space map is created as described above, repeatedly with predetermined time intervals. Thus, the latest data are sequentially stored in the storages 25, 35, 12, and so on.

Next, there will be described an example in a case of planning the path B of the robot 5 in the position management system A according to the present invention, referring to FIGS. 7-10.

(7-3) Planning Path

In a case of planning the path B, the path planner 15 plans the path B of the robot 5 based on the input detection space map.

Here, the path planner 15 can use, for instance, the artificial potential method to create the path B of the robot 5.

The artificial potential method has an advantage of being able to flexibly and automatically create the path regardless of a size of the space, the number of existing objects, or the like. Especially, the artificial potential method is advantageous inside buildings, factories, and so on where information about structures is easily acquired.

The path B is created by means of the artificial potential method as described below.

(a) First of all, the path planner 15 uses the input detection space map, the position data of the ultrasonic tags 26 and the RFID tags 36, the specific data of the objects 41 and 42 to which the ultrasonic tag 26 or the RFID tag 36 are attached, and so on to specify the position (a movement start point) of the robot 5 and the position (a target position or a movement end point) of the document O which is the target.

(b) Next, as shown in FIG. 7, the path planner 15 specifies an attractive potential field in the detection space DA. The attractive potential field is specified to make the robot 5 reach the target position (xo, yo) where the target is placed. More specifically, each of the objects in the detection space DA is projected into a two-dimensional plane (an x-y plane in FIG. 7). Then, the attractive potential field is specified in such a way that attractive potential Ua(x, y) becomes lowest in the target position (xo, yo) (for instance, the attractive potential is "0(zero)") and that in the further position (x, y) from the target, the higher the attractive potential Ua(x, y) is. Such an attractive potential field can be specified based on the following formula (4); for instance. Here, kp is a positive weight coefficient. For instance, kp is defined in such a way that the attractive potential is "1" in an initial position where the robot 5 is placed before starting movement.

$$Ua(x, y) = \frac{1}{2}kp\{(x - xo)^2 + (y - yo)^2\} \quad (4)$$

(c) Next, as shown in FIG. 8, the path planner 15 specifies the positions of the bookshelf 41a, the desk 42a, the pot plants 42b-42e, and so on which are obstacles when the robot 5 moves to the target. In addition, repulsive potential Ub(x, y) is set corresponding to x-y coordinates of the obstacles so as not to make the robot 5 approach the obstacles. The repulsive potential Ub(x, y) becomes high (for instance, the potential value becomes "1" in an obstacle region) in a region where an obstacle is placed, and its vicinity. For instance, the repulsive potential Ub(x, y) is set based on the following formula (5). Here, Ti is a positive weight constant. Po is a positive constant and a "threshold" to generate the repulsive potential Ub(x, y). The constant Po is a value to determine a distance within which the repulsive potential Ub(x, y) is calculated. The constant η is a value to adjust a magnitude of the repulsive potential Ub(x, y). The constant Po and the constant η are determined as needed corresponding to the number of the objects in the detection space DA, the calculation capacity of the main controller 13, time required until the repulsive potential calculation converges, and so on. Though it depends on accuracy in detecting the position of the robot 5, the larger the constant η is, the less likely the robot 5 is to touch the obstacles while moving, for instance. Meanwhile, the smaller the constant η is, the narrower part the robot 5 can pass through.

Moreover, in the following formula (5), P(x, y) expresses shortest distance between arbitrary coordinates (x, y) and coordinates where an obstacle is detected in the detection space DA and is calculated using the following formula (6). Coordinates (xm, ym) express all coordinates in whole regions occupied by the obstacles.

$$Ub(x, y) = \begin{cases} \frac{1}{2}\eta\left(\frac{1}{P(x, y)} - \frac{1}{Po}\right)^2 & P(x, y) \le Po \\ 0 & P(x, y) > Po \end{cases} \quad (5)$$

$$P(x, y) = \min\sqrt{(x - xm)^2 + (y - ym)^2} \quad (6)$$

(d) Then, the path planner 15 synthesizes the attractive potential Ua(x, y) and the repulsive potential Ub(x, y) set in (a)-(c) to create a synthetic potential map as shown in FIG. 9.

(e) As shown in FIG. 10, the created synthetic potential map is used to trace a position where the synthetic potential becomes lower from the current position of the robot 5, avoiding obstacles such as the bookshelf 41a and the pot plants 42b-42e. Thus, it is possible to calculate the shortest and best path for the robot 5 to move to the document O which is the target.

As shown in FIGS. 2 and 10, when the document O which is the target is put on the desk 42a which is the obstacle, the repulsive potential Ub(x, y) of the desk 42a is not taken into consideration in creating the path B. Or, even in a case of considering the repulsive potential, it is not reflected in creating the path B. Then, the robot 5 preferably recognizes that the document O is put on the desk 42a after the path B has been created.

By the way, when the path B is calculated by means of the artificial potential method, the sizes of the robot 5, the bookshelf 41a, the desk 42a, and the pot plants 42b-42e which are stored in the autonomous mobile object data storage 121 in the position data processor storage 12 are referred to determine whether the robot 5 can move along the created path B. Therefore, it is possible to prevent beforehand such a trouble that the robot 5 cannot move along the created path.

In planning the path by the above-mentioned processes (a)-(e), the path is updated at every predetermined interval of time (for instance, interval of time such as 0.1 second) or of movement distance so as to cause the robot 5 move with higher accuracy.

The path planner 15 outputs the path B created in this way to the I/O unit 11 and the autonomous mobile object data storage 121 (not shown in FIG. 6) as the path data.

(7-4) Transmitting Path to Autonomous Mobile Object

The path data from the I/O unit 11 are output to the terminal 1300 so that the path B can be displayed. Moreover, in a case of making the robot 5 move, the path data are output to the movement instructor 16.

The movement instructor 16 generates movement instruction signals based on the path data input from the path planner 15 and transmits the movement instruction signals to the robot 5 through the I/O unit 11 and the base station 1000 (see FIG. 1) by means of wireless communication.

The robot 5 receives the movement instruction signals including the path data through the wireless communicator 560 and sends the included path data to the controller 540 and the robot storage 570 of the robot 5. The controller 540 drives actuators and so on based on the path B input as the path data so as to cause the robot 5 autonomously move on two-legs for the target O. At this time, its own vision sensor and a self-position sensing system may be used.

As described above, according to the position management system A of the present invention, the path has been created in advance before the robot 5 starts moving. Therefore, it is possible to avoid aimless search for and creation of the path like conventional position management systems. As a result, it is possible to make the robot 5 more smoothly move compared with the conventional position management systems. In addition, according to the position management system A of the present invention, before the robot 5 starts moving, the positions of the all objects 41 and 42 have been specified and the path has been created in advance. Therefore, the robot 5 can smoothly move to the document O which is the target.

(8) Other Remarks

A position management system according to the present invention has been described above. However, it is to be distinctly understood that a position management system of the present invention is not limited to this but may be otherwise variously changed and modified within the spirit of the present invention.

An example of a combination of the ultrasonic tag systems 2 and the RFID tag systems 3 has been described as an example of a combination of two or more types of detection systems. However, a combination of two or more types of detection systems is not limited to this but may be any combination of detection systems which can detect positions. For instance, any of combinations of infrared tag systems and RFID tag systems, image systems and RFID systems, and so on may be employed for the position management system A.

Moreover, for instance, it is assumed that the position data processor 1 plans the path B in the above description. However, all or a part of components of the position data processor 1 may be included in the robot 5.

In addition, for instance, a gyro sensor (not shown) to detect a direction of the robot 5 to acquire direction data and a GPS receiver (not shown) to detect a current position of the robot 5 to acquire current position data may be added to the robot 5.

In this case, it is also possible to receive the current position data, which are data about the current position (coordinates) of the robot 5, from the GPS receiver.

To create the path B of the robot 5, the position data processor 1 can use the received direction data and current position data to know the position and the direction of the robot 5 with higher accuracy. Therefore, it is possible to reduce error margins which are generated when the robot 5 moves.

Description has been given to a case of employing the artificial potential method to create the path B of the robot 5. However, a method to create the path is not limited to this. For instance, a well-known graph search algorithm may also be employed. Even in a case of employing the graph search algorithm, the shortest path is searched for and the path B is determined based on the search similarly to the case of employing the artificial potential method.

Moreover, the detection result data transmitted from the ultrasonic tags 26 and the RFID tags 36 which are provided to the robot 5, the document O, bookshelf 41a, and so on may include data which express features such as sizes of objects 41 and 42 so as to reduce power consumption, cost of installing various tags, and so on.

Moreover, in the embodiment according to the present invention, the two-legged robot 5 has been described as an example of an "autonomous mobile object" described in the claims. However, an autonomous mobile object in the present invention is not limited to the two-legged robot. For instance, the autonomous mobile object may be a vacuum cleaner, an electric wheelchair, and so on which can move in accordance with task instruction signals from the position data processor 1.

In addition, the position data processor 1 of the present invention is not used necessarily to move the autonomous mobile object. There is another way to use the position data processor 1, for instance, to know positions of the objects 41 and 42 including the robot 5 in the detection space DA in order to inform arrangement of the objects 41 and 42 to a user in another site through a monitor display.

Moreover, the position data processor 1 in the position management system A matches the arrangement data stored in the position data processor storage 12 with the device IDs of the detectors 21 and 31 in order to calculate positions of the detectors 21 and 31. However, operation of the position data processor 1 according to the present invention is not limited to these. More specifically, the arrangement data of each of the detectors 21 and 31 may be stored respectively in the detector storages 25 and 35 in the detectors 21 and 31. Thus, even in a case of including the arrangement data in the detection result data when the detection result data are transmitted to the position data processor 1, the position data processor 1 can use the above-mentioned hardware in order to specify positions of the objects 41 and 42 and to create the path B with higher accuracy.

In the embodiments, the transmitter-receiver 22 provided in the detector 21 transmits radio wave signals including transmission instructions to the ultrasonic tags 26 and receives ultrasonic wave signals including the unique tag IDs from the ultrasonic tags 26. However, the invention is not limited to this. For instance, in another mode, the transmitter-receiver 22 may issue a transmission instruction to a specific ultrasonic tag 26 in accordance with an instruction from the position data processor 1. In response to this, the specific ultrasonic tag 26 to which the transmitter-receiver 22 has issued the transmission instruction may transmit an ultrasonic wave signal.

The position data processor 1 may be implemented by a position management program which causes a general computer to function as the above-mentioned components. The position management program may be distributed through telecommunication or may be written to recording media such as a CD-ROM to be distributed.

It has been impossible to solve an occlusion problem while detecting three-dimensional positions with high reliability and accuracy in any of navigation systems such as a completely autonomous navigation system including cameras and ultrasonic sensors, an inside environmental marker reference navigation system referring to markers such as magnetic markers or markers in specific shapes, a navigation system using cameras arranged in environments, and a conventional navigation system using ultrasonic waves and infrared radiations. However, as described above, the position management system includes the two or more types of detection tags, the position data processor with plural detectors corresponding to the types of the detection tags, and the robot with the above-mentioned configuration. Therefore, it is possible to prevent the occlusion problem and at the same time to detect three-dimensional positions of various objects to be detected in a space with high reliability and accuracy.

According to the position management system of the present invention, two or more types of detection tags which complement their detection abilities with each other and the detectors corresponding to the detection tags are applied to objects to be detected which may have an occlusion problem since being placed behind another object, or the like. Therefore, it is possible to prevent situations where it is impossible to specify positions of objects to be detected. In addition, it is possible to specify three-dimensional positions with high accuracy.

In other words, according to the present invention, it is possible to prevent an occlusion problem and to detect three-dimensional position information of various objects to be detected with high reliability and accuracy in a space where it is necessary to detect positions.

Moreover, application of the present invention, which can detect three-dimensional positions of various objects to be detected with higher accuracy, improves accuracy and reliability of navigation and manipulation operations of mobile objects.

In addition, according to a position management program of the present invention, it is possible to make a computer function to detect the three-dimensional position information of various objects to be detected which are placed in a detection space and to specify the positions of the objects to be detected with high accuracy. As a result, it is possible to solve the occlusion problem and at the same time to specify positions of objects to be detected with high accuracy.

Furthermore, according to a position management program of the present invention, it is possible to make a computer function to plan a path with high accuracy.

While the described embodiments represent the preferred forms of the present invention, it is to be distinctly understood that the invention is not limited thereto but may be otherwise variously embodied within the spirit and scope of the following claims.

What is claimed is:

1. A position management system comprising: two or more types of detection tags provided to objects whose positions are to be detected, the type of detection tag is selectively provided in accordance with particular characteristics of each of the objects; detectors provided corresponding to the detection tags; wherein two or more types of the detectors are alternately arranged in grids with predetermined spaces in a ceiling of a detection space; and a position data processor, wherein the detection tags complement detection abilities with each other, wherein when a detector receives a signal from a detection tag provided to an object, the detector generates detection result data including a unique tag ID which is assigned to the detection tag and a device ID which is assigned to the detector, and wherein the position data processor processes the detection result data acquired from the detector and arrangement data of the detector in order to specify a position of the object.

2. A position management system as claimed in claim 1, wherein
   the detection tags are ultrasonic tags and RFID tags.

3. A position management system as claimed in claim 2, wherein
   the objects include at least an autonomous mobile object, and wherein
   the position data processor creates a path of the autonomous mobile object based on information about a movement start point and a movement end point of the autonomous mobile object and the specified position of the object and informs the created path to the autonomous mobile object.

4. A position management system as claimed in claim 1, wherein
the objects includes at least an autonomous mobile object, and wherein
the position data processor creates a path of the autonomous mobile object based on information about a movement start point and a movement end point of the autonomous mobile object and the specified position of the object and informs the created path to the autonomous mobile object.

5. A position management system as claimed in claim 1, wherein the objects include at least an autonomous mobile object, and wherein the position data processor creates a path of the autonomous mobile object based on information about a movement start point and a movement end point of the autonomous mobile object and the specified position of the object and informs the created path to the autonomous mobile object.

6. A position management system as claimed in claim 1, wherein one of the two or more types of detection tags is provided to objects that are placed behind other objects and are difficult to supply power to, and the other one of the two or more types of detection tags is provided to objects that have no occlusion problem and are easy to supply power to.

7. A position management system as claimed in claim 1,wherein the position data processor processes includes an I/O unit, a position data processor storage, and a main controller having a map generator and a path planner.

8. A position management system as claimed in claim 1, wherein the detection result data generated by the detectors further includes characteristics features of objects including a shape and a size of the object.

9. A computer readable storage medium storing a position management program for a position management system, the position management system comprising: two or more types of detection tags provided to objects whose positions are to be detected, the type of detection tag being selectively provided in accordance with particular characteristics of each of the objects; and detectors provided corresponding to the detection tags; wherein two or more types of the detectors are alternately arranged in grids with predetermined spaces in a ceiling of a detection space; wherein the detection tags complement detection abilities with each other, and wherein when a detector receives a signal from a detection tag provided to an object, the detector generates detection result data including a unique tag ID which is assigned to the detection tag and a device ID which is assigned to the detector, the computer readable storage medium storing the position management program for causing a computer to implement a method comprising: processing the detection result data acquired from the detector and arrangement data of the detector; specifying a position of the object; and managing positions of the objects in a detection space.

10. A computer readable storage medium as claimed in claim 9, wherein
the objects includes at least an autonomous mobile object, the computer readable storage medium storing the position management program to cause the computer to implement the method further comprising:
creating a path of the autonomous mobile object based on information about a movement start point and a movement end point of the autonomous mobile object and the specified position of the object; and
informing the created path to the autonomous mobile object.

* * * * *